United States Patent
Downes et al.

(10) Patent No.: US 12,450,250 B1
(45) Date of Patent: Oct. 21, 2025

(54) SYSTEM AND METHOD FOR INFORMATION EXTRACTION FROM A PLURALITY OF ELECTRONIC DOCUMENTS

(71) Applicant: Catylex, Inc., Irvington, NY (US)

(72) Inventors: Andrew Downes, Irvington, NY (US); David Rosen, Hartsdale, NY (US); Dhruv Sharma, Jaipur (IN); Jamie Wodetzki, Irvington, NY (US)

(73) Assignee: CATYLEX, INC., Irvington, NY (US)

( * ) Notice: Subject to any disclaimer, the term of this patent is extended or adjusted under 35 U.S.C. 154(b) by 0 days.

(21) Appl. No.: 18/505,712

(22) Filed: Nov. 9, 2023

Related U.S. Application Data (60) Provisional application No. 63/383,061, filed on Nov. 9, 2022.

(51) Int. Cl.
| | |
|---|---|
| *G06F 7/02* | (2006.01) |
| *G06F 16/00* | (2019.01) |
| *G06F 16/25* | (2019.01) |
| *G06F 16/906* | (2019.01) |
| *G06F 16/93* | (2019.01) |

(52) U.S. Cl.
CPC .......... *G06F 16/254* (2019.01); *G06F 16/906* (2019.01); *G06F 16/93* (2019.01)

(58) Field of Classification Search
CPC ....... G06F 16/254; G06F 16/906; G06F 16/93
See application file for complete search history.

(56) References Cited

U.S. PATENT DOCUMENTS

| | | | |
|---|---|---|---|
| 11,893,050 B2* | 2/2024 | Yamada | G06F 16/93 |
| 2019/0347284 A1* | 11/2019 | Roman | G06F 40/194 |
| 2020/0257761 A1* | 8/2020 | Bull | G06F 40/289 |
| 2021/0192126 A1* | 6/2021 | Gehrmann | G06N 20/00 |
| 2022/0067287 A1* | 3/2022 | Cobb | G06F 40/205 |
| 2022/0138168 A1* | 5/2022 | Veselova | G06F 16/24532 |
| | | | 707/692 |

\* cited by examiner

*Primary Examiner* — Bruce M Moser (57) ABSTRACT

In a computer-implemented method for extracting information from a plurality of electronic documents, a plurality of electronic documents is accessed. Each electronic document of the plurality of electronic documents is segmented into segments comprising at least one word. The segments are converted into content-sensitive vectorizations. The content-sensitive vectorizations are compared to identify the content-sensitive vectorizations that are within a similarity threshold. Segments having content-sensitive vectorizations that are within the similarity threshold are grouped into a plurality of segment groups. Information is extracted from the plurality of segment groups for performing analysis of the plurality of electronic documents.

20 Claims, 8 Drawing Sheets

SYSTEM AND METHOD FOR INFORMATION EXTRACTION FROM A PLURALITY OF ELECTRONIC DOCUMENTS

RELATED APPLICATION

This application claims priority to and the benefit of U.S. Provisional Patent Application 63/383,061, filed on Nov. 9, 2022, entitled "SYSTEM AND METHOD FOR INFORMATION EXTRACTION FROM A PLURALITY OF ELECTRONIC DOCUMENTS," by Downes, et al., and assigned to the assignee of the present application, which is incorporated herein by reference in its entirety.

BACKGROUND

Analysis of large amounts of complex documents, such as contracts, is typically very costly and time consuming. In order to reduce costs and time for complex document analysis, computer-based systems have been utilized to analyze such documents, extract information and derive meaning therefrom, and report back to a user. Despite the use of software to improve the speed of such analysis, these systems would benefit from further enhancements to document analysis.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DETAILED DESCRIPTION OF CERTAIN EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "receiving," "accessing," "segmenting," "executing," "analyzing," "classifying," "applying," "training," "testing," or the like, refer to the actions and processes of an electronic computing device or system such as: a host processor, a processor, a memory, a cloud-computing environment, a software defined network (SDN) manager, a system manager, a virtualization management server or a virtual machine, among others, of a computer system or of a distributed computing system, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Embodiments described herein provide methods and systems for information extraction from a plurality of electronic documents. Systems for the analysis and evaluation of electronic documents, such as legal contracts, are used to efficiently analyze these documents, reducing the need for human evaluation, which significantly reduces time and cost in such an analysis. In many situations, a large corpus of documents, such as contracts or similar documents, for a given enterprise is likely to have many repeated terms and concepts across the corpus. Conventional systems for extracting information from those contracts using computers and/or people tends to entail significant redundant work. The described embodiments provide for information extraction from a corpus of documents for analysis that identifies redundant information, which significantly reduces processing time and costs for analysis of such documents. It should be appreciated that the efficiency benefits of the described embodiments is related to the amount of similarity or homogeneity of the corpus of documents. The described embodiments leverage commonality across a large number of documents to identify identical, similar, and different sections to organize and expedite review of the documents.

In accordance with various embodiments, information extraction is performed on a plurality of documents. In some embodiments, the plurality of documents includes physical documents, which are converted to a digital textual format by scanning and performing optical character recognition (OCR), or another process for converting images of text to digital text. In some embodiments, the plurality of documents are received in a digital text format.

Once the plurality of documents is received in a digital text format, text segmentation is performed on the plurality of documents to break the text of each document into segments. Text segmentation, as used herein, is the process of breaking up a text-based document into coherent and semantically meaningful contiguous segments. It should be appreciated that the segments can be at the word, sub-sentence, sentence, paragraph, block, table, page, section, or any other level of segmentation.

Subsequent to the segmentation of the plurality of electronic documents, each segment is either left as a string of text characters or converted into a content-sensitive vector (e.g., a hash) using a content-sensitive vectorization algorithm. In general, content-sensitive vectorization is an algorithmic technique that hashes similar input items into the same groupings with high probability. Content-sensitive vectorization or content-sensitive hashing, as utilized herein, specifically refers to an algorithm or function that is applied to a text string (e.g., a segment) for generating a fingerprint or signature for the text string where the greater the similarity between two text strings, the greater the similarity between the hashes or vectors of the two text strings. Common types of content-sensitive vectorizations which may appear in embodiments include locality sensitive hashing and word embedding, including, without limitation, word embedding generated with neural networks, explicit and implicit matrix factorization, probabilistic models, explainable knowledge base methods, and explicit representation in terms of the context in which words appear. For example, two segments that are similar will have content-sensitive vectorization hashes that are similar, while two segments that are very different will have content-sensitive vectorization hashes that are less similar. Content-sensitive vectorization hashing can be contrasted with cryptographic hashing where slight variances in the input drastically change the output. Content-sensitive vectorization hashing is useful in determining whether two segments are identical or similar.

It should be appreciated that other embodiments may use alternate methods to content-sensitive vectorization, such as clustering or direct text matching. It should also be appreciated that in accordance with some embodiments, text normalization can be performed to normalize the content of each document. For example, double spaces can be treated as single spaces, smart quotes as quotes, etc., so as to expand the determination as to what segments are identical.

The content-sensitive vectors for each document of the plurality of electronic documents are then compared, and segments having identical content-sensitive vectors are identified. In some embodiments, identical segments are identified as those having identical content-sensitive vectors. In other embodiments, for example where text normalization was not performed prior to the generation of the content-sensitive vectors, identical segments are identified as those having content-sensitive vectors or hash values within a threshold range (e.g., a similarity threshold).

In some embodiments, for each document, the number of segments in other documents that are duplicates of segments in that document (referred to as "external duplicate segments") are counted. For efficiency, the result of the counting can be used for selecting documents with the highest or a high number of external duplicate segments for which to start the document review. The documents are then sorted to start the review process. It should be appreciated that selection of an appropriate starting document and sorting can improve the performance of the review process. For example, an iterative process can be used which first identifies the document with most common external duplicate segments and add that to the documents to review. All of the identified duplicate segments from remaining documents are then removed. The identification of a document and the removal of duplicate segments is iteratively performed until there are no documents left to iterate. In some embodiments, to make this process more efficient, early stopping criteria can be utilized such that if the number of the most common duplicate segments is below a certain threshold, all the documents are added to the sorted review list as is. This early stopping criteria can make the process more efficient especially for corpuses that contain a very large number of heterogeneous contracts.

In some embodiments, using natural language processing (NLP) or manual reviewers (or a combination thereof), information is extracted from the documents in the order of a sorted review list into a database containing the location and order of each segment as well as the label and value of the extracted information. The extracted information is propagated from duplicate segments to external duplicate segments into the extraction database with reference to the location of the segments in the documents in which they occur. In some embodiments, segments that are not duplicate segments, but have a content-sensitive vector or hash within a predefined range of distance from each other or are within a threshold distance of each other, are identified as similar segments. For example, hash distances for ranges can be arbitrarily defined, or can be adjusted based on human feedback to increase or decrease the number of substantively similar sentences captured within all ranges or within a particular range.

In some embodiments, using a graphical user interface (GUI), changes from the first or most frequently occurring similar segment in a range with a text comparison algorithm are highlighted or otherwise shown (e.g., a "Redline GUI"). In the Redline GUI, a human operator able to designate one or more groups of similar segments as substantively duplicative, in which case the process will handle that group as it would duplicate segments (e.g., propagating any extracted information in respect of the relevant external duplicate segments within the extraction database). In some embodiments, alternately or additionally, a tool could be used to identify within differing text from within similar segments specific spans that could be normalized and algorithmically assigned values (for example, for three segments, "The Governing Law is California", "The Governing Law is Delaware" and "The Governing Law is New York", the differences could be recognized as US States, with as each being a Governing Law provision.

Example System for Analysis of Electronic Documents

Figure 1:
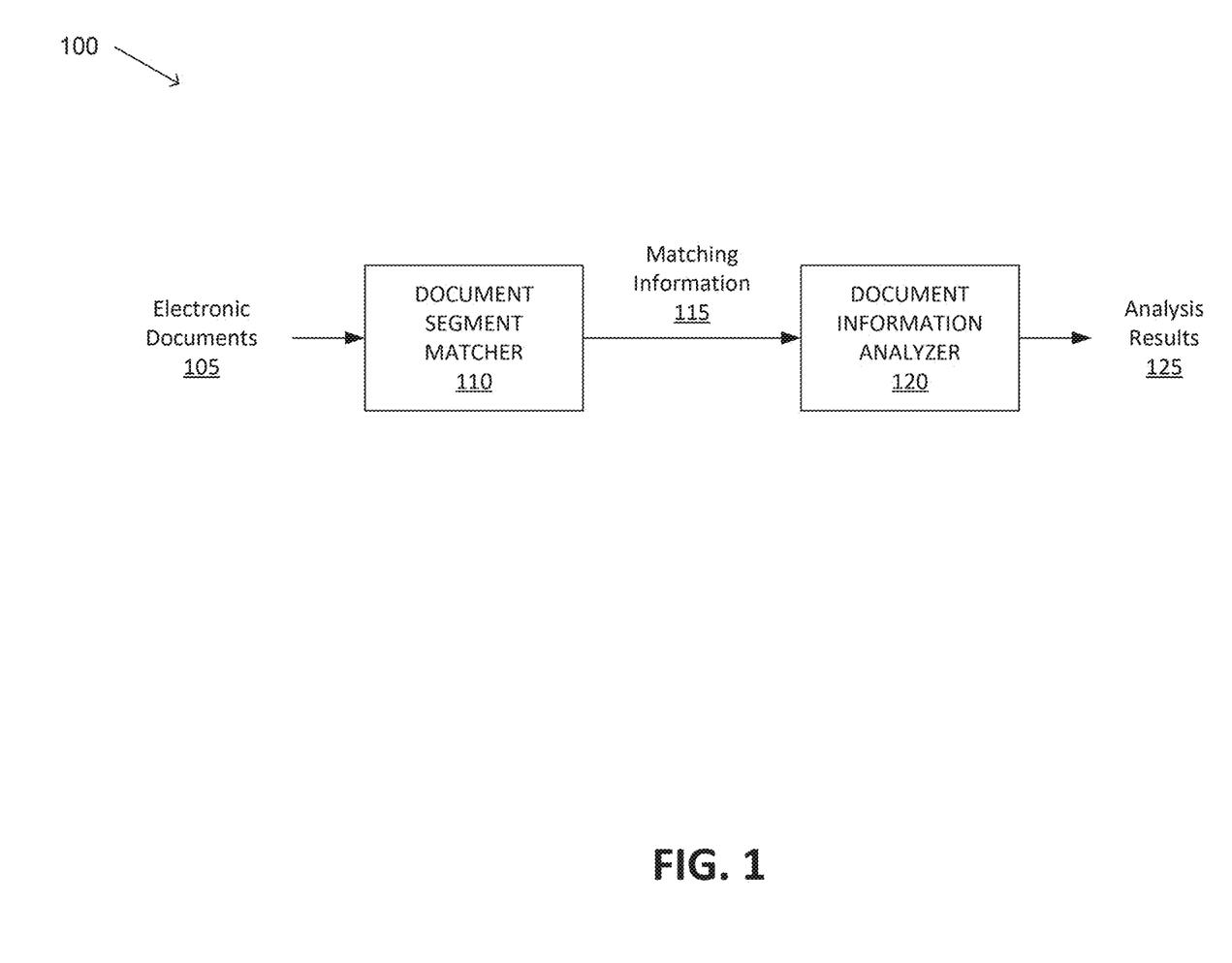
FIG. 1 is a block diagram illustrating an example system for analysis of electronic documents, in accordance with embodiments.

FIG. 1 is a block diagram illustrating an embodiment of a system 100 for analysis of electronic documents, according to embodiments. It should be appreciated that system 100 can include any number of components, of which the illustrated embodiment is one example. Moreover, the components can be distributed over a network of computing devices in many different configurations. In some embodiments, multiple components may operate on a particular computing device, while performing independently of other components on the computing device. In other embodiment, the components are distributed across multiple nodes (e.g., for purposes of reliability and scalability). It should also be appreciated that the components of system 100 operate cooperatively to perform analysis of one or more electronic documents. It should be appreciated that the described components can be implemented as system as a service (SAAS) components. It should be appreciated that system 100 can be implemented as hardware, software, or any combination thereof. It should also be appreciated that document segment matcher 110 and document information analyzer 120 may be separate components, may be comprised within a single component, or may be comprised in various combinations of multiple components, in accordance with some embodiments.

In some embodiments, system 100 is configured for automated analysis of legal documents (e.g., contracts). A legal contract is received and analyzed against a knowledge model based on a corpus of complex legal documents, using a machine learning, rules and analytics framework. Machine learning (supervised and unsupervised) and rules-based algorithms may be used to perform the analysis. The analysis of the legal contract includes the extraction of high fidelity data, and the results of the analysis provide a user with contextual meaning of the terms of the legal contract. System 100 is configured to analyze and evaluate the entire contents of a legal contract, including analysis of language at a variety of levels, from the very granular level of word(s), phrases and other components within each sentence to the sentence level, and then successively larger groups of words.

Figure 4A:
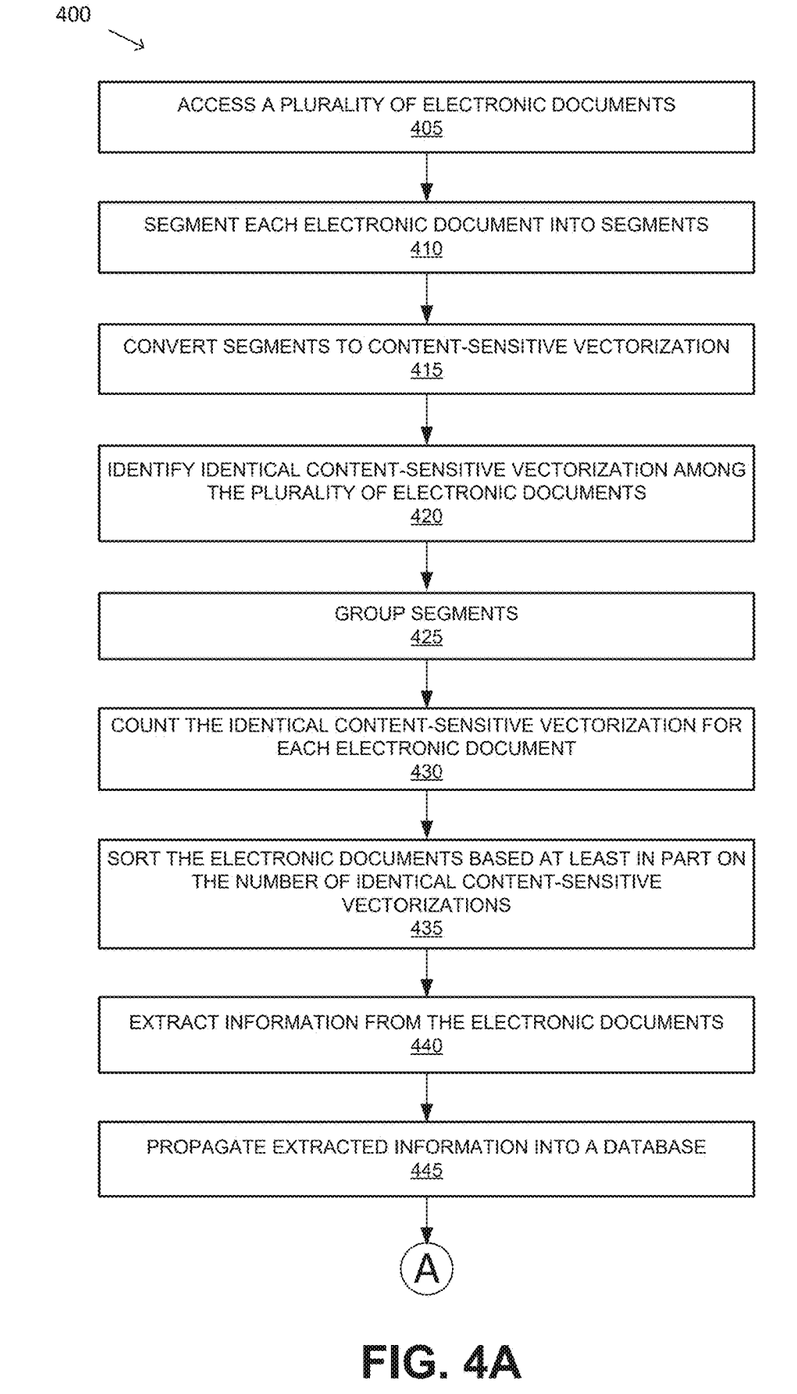
FIGS. 4A through 4C depict flow diagrams for example processes of information extraction from a plurality of electronic documents, according to embodiments.

System 100 includes document segment matcher 110 and document information analyzer 120. Document segment matcher 110 is configured to perform information extraction on electronic documents 105. In some embodiments, documents are received as physical documents, which are converted to a digital textual format at system 100 by scanning and performing optical character recognition (OCR), or another process for converting images of text to digital text. In some embodiments, the plurality of documents are received in a digital text format In accordance with some embodiments, document segment matcher 110 performs information extraction from a corpus of electronic documents 105 by determining matching portions of electronic documents 105 for analysis (e.g., at document information analyzer 120) that identifies redundant information, which significantly reduces processing time and costs for analysis of such documents. It should be appreciated that the efficiency benefits of the described embodiments are related to the amount of similarity or homogeneity of the corpus of documents. The described embodiments leverage commonality across a large number of documents to identify identical, similar, and different sections to organize and expedite review of the documents. In some embodiments, document segment matcher 110 performs the procedures of flow diagram 400 of FIG. 4 for generating matching information 115.

Document information analyzer 120 receives matching information 115 and is configured to perform analysis on electronic documents 105 using the matching information 115 to generate analysis results 125.

Figure 2A:
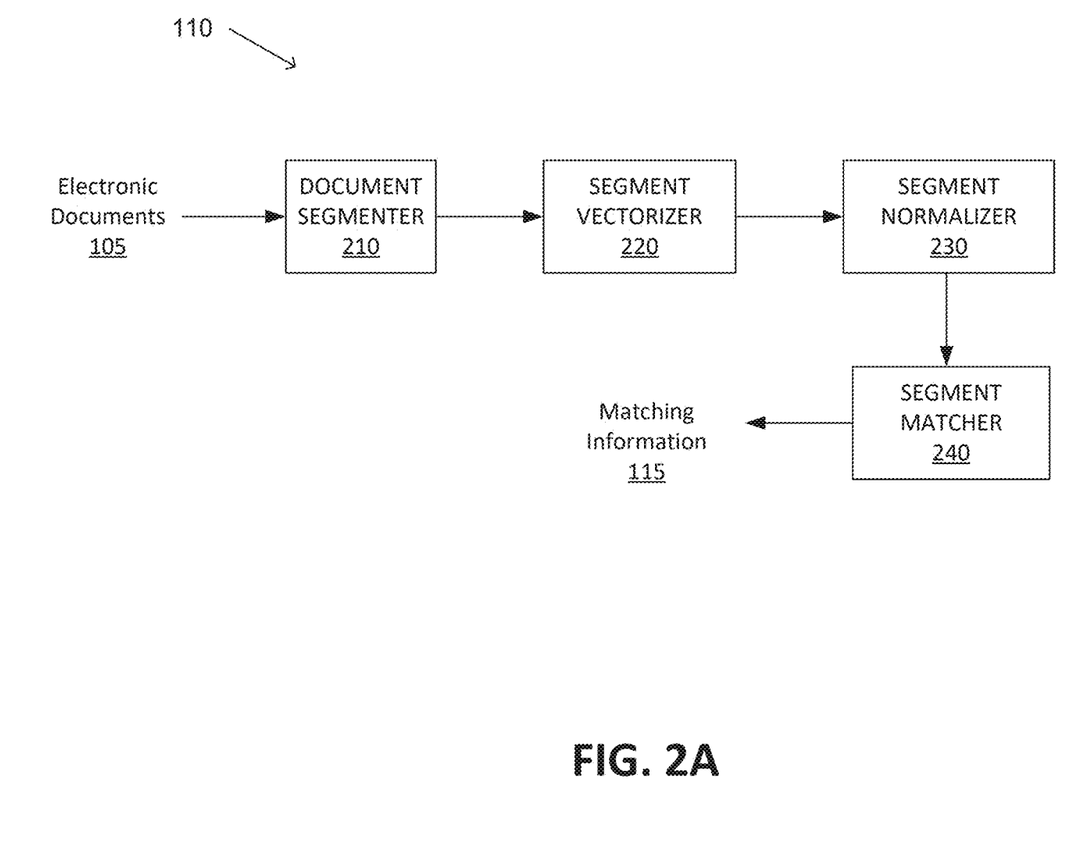
FIG. 2A is a block diagram illustrating an example electronic document segment matching of a system for analysis of electronic documents, in accordance with embodiments.

FIG. 2A is a block diagram illustrating an example electronic document segment matcher 110 of a system 100 for analysis of electronic documents, in accordance with embodiments. Document segment matcher 110 is configured to receive and assemble a large corpus of documents and segment such documents into groups of words, also referred to herein as "segments," and to determine which segments are matching across the source electronic documents.

In accordance with the described embodiments, document segment matcher 110 is configured to break down an electronic document into segments of different groups of words. Electronic documents 105 are received at document segmenter 210 which is configured to perform segmentation on electronic documents 105. In some embodiments, electronic documents 105 are segmented into segments of different groups of word types based on certain unique features of such groups of words. Text segmentation, as used herein, is the process of breaking up a text-based document into coherent and semantically meaningful contiguous segments. It should be appreciated that the segments can be at the word, sub-sentence, sentence, paragraph, table, block, page, section, entire document, or any other level of segmentation.

Segment vectorizer 220 receives the output segments of document segmenter 210 and is configured to convert each segment into a content-sensitive vector (e.g., a hash) using a content-sensitive vectorization algorithm. In general, content-sensitive vectorization is an algorithmic technique that hashes similar input items into the same groupings with high probability. Content-sensitive vectorization or content-sensitive hashing, as utilized herein, specifically refers to an algorithm or function that is applied to a text string (e.g., a segment) for generating a fingerprint or signature for the text string where the greater the similarity between two text strings, the greater the similarity between the hashes of the two text strings. Common types of content-sensitive vectorizations which may appear in embodiments include locality sensitive hashing and word embedding, including, without limitation, word embedding generated with neural networks, explicit and implicit matrix factorization, probabilistic models, explainable knowledge base methods, and explicit representation in terms of the context in which words appear. For example, two segments that are similar will have content-sensitive vectorization hashes that are similar, while two segments that are very different will have content-sensitive vectorization hashes that are less similar. Content-sensitive vectorization hashing can be contrasted with cryptographic hashing where slight variances in the input drastically change the output. Content-sensitive vectorization hashing is useful in determining whether two segments are identical or similar. It should be appreciated that other embodiments may use alternate methods to content-sensitive vectorization, such as clustering or direct text matching.

It should also be appreciated that in accordance with some embodiments, text normalization can be performed to normalize the content of each document. For example, double spaces can be treated as single spaces, smart quotes as quotes, etc., so as to expand the determination as to what segments are identical. In accordance with some embodiments, document segment matcher 110 includes segment normalizer 230 for performing normalization on segments. For example, where a content-sensitive vector for two segments is similar (e.g., within a similarity threshold), these segments can be treated as identical for purposes of matching. In other embodiments, segments or portions of segments that are not identical, but are surrounded by identical segments, can be normalized by being removed from consideration.

In some embodiments, segment normalizer 230 performs normalization of segments by identifying and removing or otherwise not considering portions of the segments that are non-substantive, thereby normalizing the segments for analysis. For example, non-substantive portions can include words or phrases that are not material to the concept or purpose of the segment, such as a specific numeric cap of a limitation on liability or a particular state or country of a most favored nations clause. In such cases, the legal or conceptual purpose of the segment is preserved, while variables (e.g., dollar amounts, quantities, party names, state or country of governing law, etc.) can be ignored during segments analysis.

At segment matcher 240, the content-sensitive vectors for each document of the plurality of electronic documents are then compared, and segments having identical content-sensitive hashes are identified. In some embodiments, identical segments are identified as those having identical content-sensitive hash. In other embodiments, for example where text normalization was not performed prior to the generation of the content-sensitive hashes, identical segments are identified as those having content-sensitive hash values withing a threshold range. Segment matcher 240 generates matching information 115 as output, where matching information 115 includes data on which segments of electronic documents 105 are matching, for use in efficiently handling analysis of electronic documents 105.

Figure 2B:
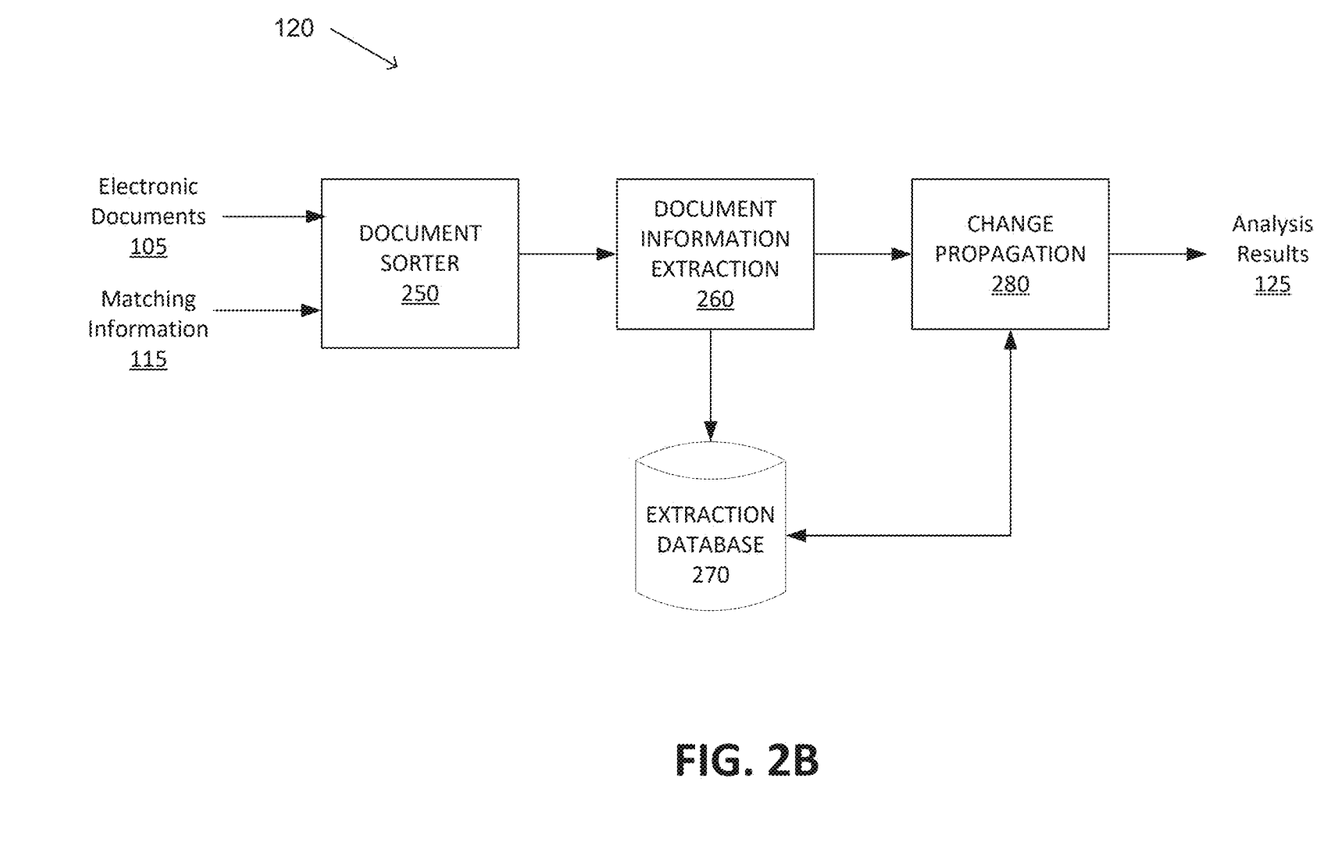
FIG. 2B is a block diagram illustrating an example document analysis of a system for analysis of electronic documents, in accordance with embodiments.

FIG. 2B is a block diagram illustrating an example document information analyzer 120 of system 100 for analysis of electronic documents, in accordance with embodiments. Electronic documents 105 and matching information 115 is received at document information analyzer 120. In some embodiments, document information analyzer 120 includes document sorter 250 for sorting electronic documents 105 for purposes of expediently handling document analysis.

In some embodiments, for each document, the number of segments in other documents that are duplicates of segments in that document (referred to as "external duplicate segments") are counted. For efficiency, the result of the counting can be used for selecting documents with the highest or a high number of external duplicate segments for which to start the document review. The documents are then sorted to start the review process. It should be appreciated that selection of an appropriate starting document and sorting can improve the performance of the review process. For example, an iterative process can be used which first identifies the document with most common external duplicate segments and add that to the documents to review. All of the identified duplicate segments from remaining documents are then removed. The identification of a document and the removal of duplicate segments is iteratively performed until there are no documents left to iterate. In some embodiments, to make this process more efficient, early stopping criteria can be utilized such that if the number of the most common duplicate segments is below a certain threshold, all the documents are added to the sorted review list as is. This early stopping criteria can make the process more efficient especially for corpuses that contain a very large number of heterogeneous contracts.

At document information extraction 260, information is extracted from the segments of electronic documents 105 for performing analysis of electronic documents 105. In some embodiments, using natural language processing (NLP) or manual reviewers (or a combination thereof), information is extracted from the documents in the order in sorted review list into extraction database 270 including the location and order of each segment as well as the label and value of the extracted information. The extracted information is propagated from duplicate segments to external duplicate segments into the extraction database with reference to the location of the segments in the documents in which they occur. In some embodiments, segments that are not duplicate segments, but have a content-sensitive hash within a predefined range of distance from each other or are within a threshold distance of each other, are identified as similar segments. For example, hash distances for ranges can be arbitrarily defined, or can be adjusted based on human feedback to increase or decrease the number of substantively similar sentences captured within all ranges or within a particular range.

In some embodiments, using a graphical user interface (GUI), changes from the first or most frequently occurring similar segment in a range with a text comparison algorithm are highlighted or otherwise shown (e.g., a "Redline GUI"). In the Redline GUI, a human operator able to designate one or more groups of similar segments as substantively duplicative, in which case the process will handle that group as it would duplicate segments (e.g., propagating any extracted information in respect of the relevant external duplicate segments within the extraction database). In some embodiments, alternately or additionally, a tool could be used to identify within differing text from within similar segments specific spans that could be normalized and algorithmically assigned values (for example, for three segments, "The Governing Law is California", "The Governing Law is Delaware" and "The Governing Law is New York", the differences could be recognized as US States, with as each being a Governing Law provision).

In some embodiments, edits can be made to segments and propagated to other similar or identical segments at change propagation 280. For example, changes can be received at a GUI and propagated to the segments at extraction database 270. Changes made to one segment can be propagated to all segments, thereby allowing for collective analysis and modification of a plurality of segments, improving analysis times and costs as compared to individual analysis of each segment.

The embodiments of the present invention greatly extend beyond conventional methods of extraction of information from electronic documents, such as legal contracts. The described embodiments provide a method for information extraction by identifying identical and/or similar information across a plurality of electronic documents, thereby improving the performance of the overall system of document analysis by reducing redundant processing requirements and cost. Hence, the embodiments of the present invention greatly extend beyond conventional methods of information extraction from a plurality of electronic documents. Moreover, embodiments of the present invention amount to significantly more than merely using a computer to perform the information extraction from the electronic documents. Instead, embodiments of the present invention specifically recite a novel process, rooted in computer technology, for information extraction from electronic documents, to overcome a problem specifically arising in the realm of automated analysis within computer systems.

Figure 3:
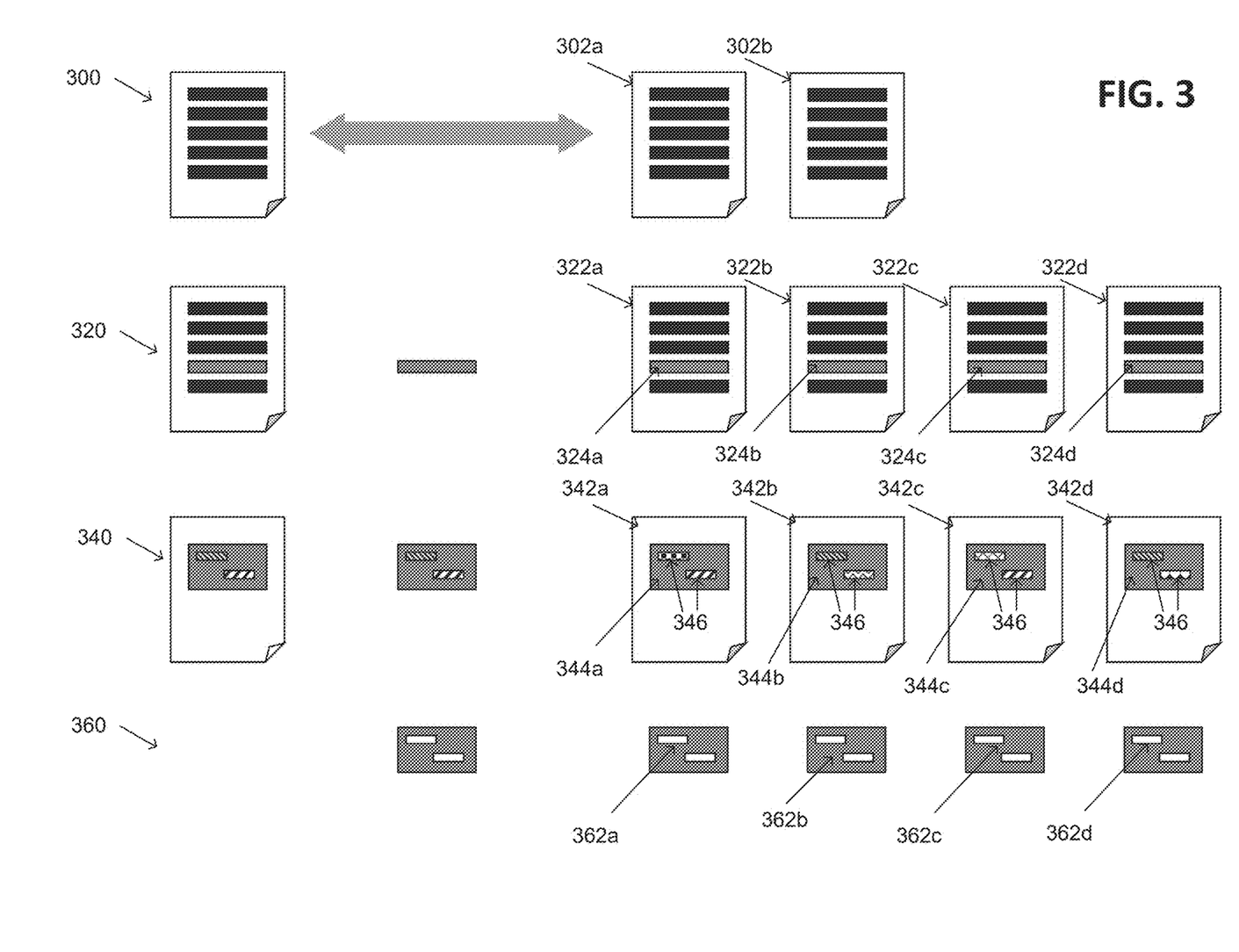
FIG. 3 is a schematic diagram illustrating segment matching across a plurality of documents utilizing segment normalization, according to embodiments.

FIG. 3 is a schematic diagram illustrating segment matching across a plurality of documents utilizing segment normalization, according to embodiments. Various embodiments described herein provide for identification of matching segments of electronic documents, including normalization of segments by identifying and removing or otherwise not considering portions of the segments that are non-substantive, thereby normalizing the segments for analysis. For example, non-substantive portions can include clauses that are not material to the concept or purpose of the segment, such as a specific numeric cap of a limitation on liability or a particular state or country of a most favored nations clause. In such cases, the legal or conceptual purpose of the segment is preserved, while variables (e.g., dollar amounts, quantities, party names, state or country of governing law, etc.) can be ignored during segments analysis.

In some embodiments, changes made to a normalized segment can be propagated to other equivalent normalized segments, and the non-substantive portions can be restored to the segments upon completion of analysis, allowing for segments of multiple documents to be analyzed and modified collectively, reducing analysis times and costs.

It should be appreciated that for purposes of the instant application, segments can be of any size, including: entire documents, paragraphs, sentences, clauses, phrases, words, etc. For instance, operation 300 illustrates an example document level matching, where a segment is an entire document. As illustrated, electronic documents 302a and 302b are matching documents. Operation 320 illustrates an example sentence level matching, where a plurality of electronic documents 322a-d are analyzed using content-sensitive vectorizations to identify matching sentences 324a-d. While operations 300 and 320 described exact matching, it should be appreciated that operations 300 and 320 can be performed using normalization of the segments allowing for matching of similar but not identical segments.

Operation 340 illustrates example segment normalization for electronic documents 342a-d, where non-substantive portions 346 of segments 344a-d are identified and removed or otherwise removed from consideration during analysis of the segments. When non-substantive portions are removed, the remaining portions of the segments are identical, allowing for collective analysis of the normalized segments, as illustrated as normalized segments 362a-d in operation 360. In some embodiments, changes made to one segment can be propagated to all segments, thereby allowing for collective analysis and modification of a plurality of segments, improving analysis times and costs as compared to individual analysis of each segment. Once changes to the normalized segments have been made and propagated, the removed non-substantive portions can be replaced, thereby restoring the segments after editing.

Example Methods of Operation

Figure 4B:
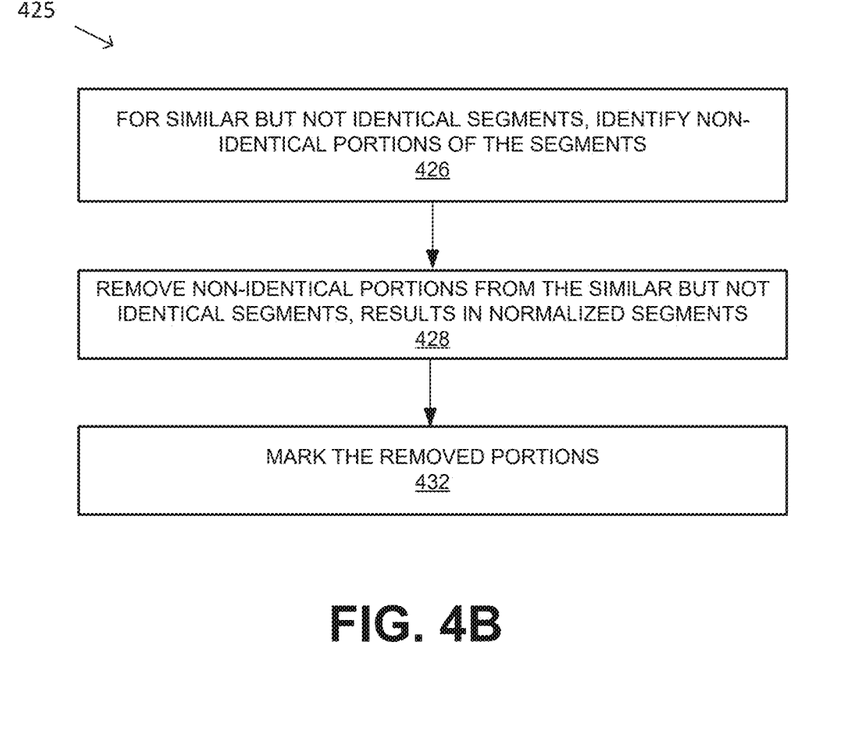
Figure 4C:
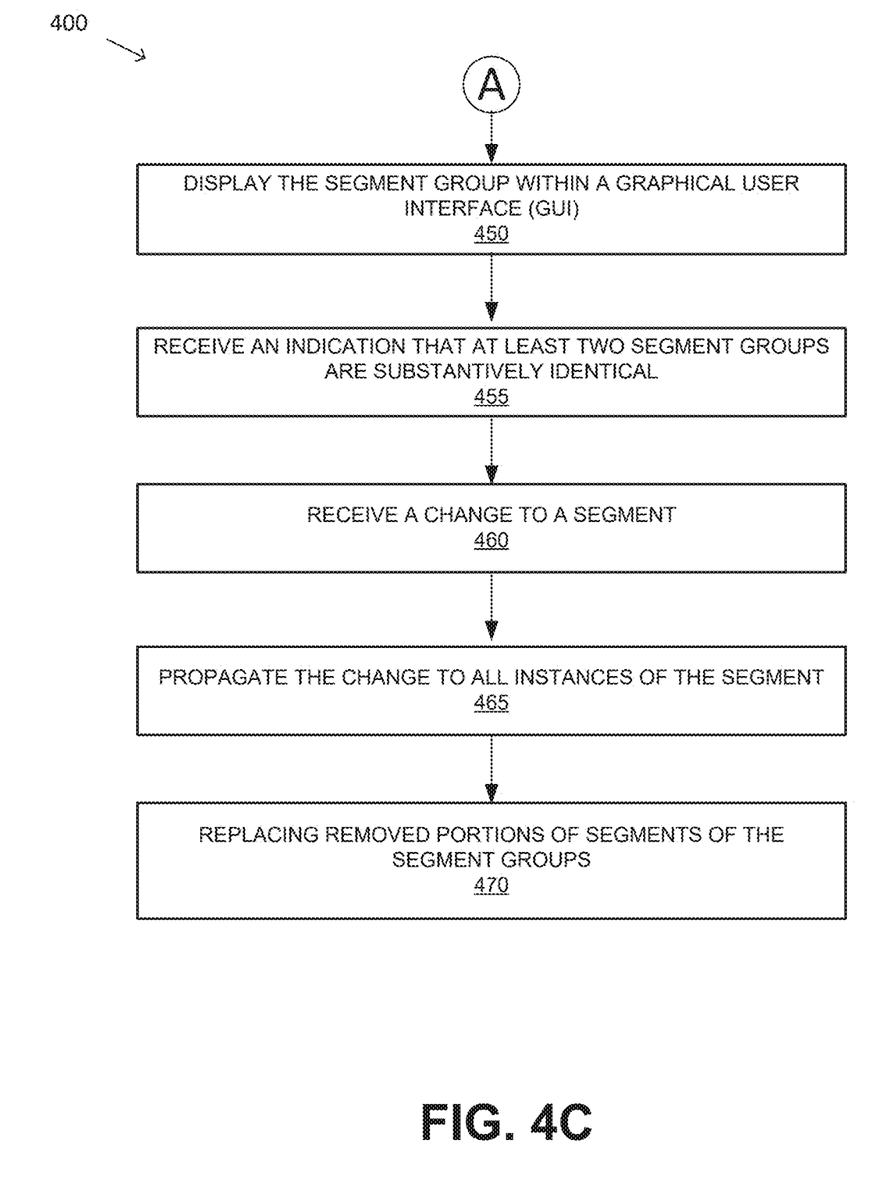

The following discussion sets forth in detail the operation of some example methods of operation of embodiments. With reference to FIGS. 4A through 4C, flow diagrams illustrate example procedures used by various embodiments. The flow diagrams of FIGS. 4A through 4C include some procedures that, in various embodiments, are carried out by a processor under the control of computer-readable and computer-executable instructions. In this fashion, procedures described herein and in conjunction with the flow diagrams are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 500). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in the flow diagram, such procedures are examples. That is, embodiments are well suited to performing various other procedures or variations of the procedures recited in the flow diagram. Likewise, in some embodiments, the procedures in the flow diagrams of FIGS. 4A through 4C may be performed in an order different than presented and/or not all of the procedures described in the flow diagrams of FIGS. 4A through 4C may be performed. It is further appreciated that procedures described in the flow diagrams of FIGS. 4A through 4C may be implemented in hardware, or a combination of hardware with firmware and/or software provided by computer system 500.

FIG. 4A depicts a flow diagram 400 for extracting information from a plurality of electronic documents, according to an embodiment. At procedure 405 of flow diagram 400, a plurality of electronic documents is accessed. In one embodiment, the plurality of electronic documents includes legal contracts. In some embodiments, a plurality of physical documents is received, which documents are converted to a digital textual format by scanning and performing optical character recognition (OCR), or another process for converting images of text to digital text. In some embodiments, the plurality of documents is received in a digital text format.

At procedure 410, text segmentation is performed automatically on the plurality of documents to break the text of each document into segments. Text segmentation, as used herein, is the process of breaking up a text-based document into coherent and semantically meaningful contiguous segments. It should be appreciated that the segments can be at the word, sub-sentence, sentence, paragraph, block, table, page or any other level of segmentation.

At procedure 415, in accordance with some embodiments, each segment is converted into a vector or hash using a content-sensitive vectorization algorithm. Content-sensitive vectorization or content—sensitive hashing, as utilized herein, refers to an algorithm or function that is applied to a text string (e.g., a segment) for generating a fingerprint or signature for the text string where the greater the similarity between two text strings, the greater the similarity between the hashes of the two text strings. According to various embodiments, types of content-sensitive vectorizations which may be used herein include locality sensitive hashing and word embedding, including, without limitation, word embedding generated with neural networks, explicit and implicit matrix factorization, probabilistic models, explainable knowledge base methods, and explicit representation in terms of the context in which words appear. For example, two segments that are similar will have content-sensitive vectorization hashes that are similar, while two segments that are very different will have content-sensitive vectorization-hashes that are less similar. Content-sensitive vectorization hashing can be contrasted with cryptographic hashing where slight variances in the input drastically change the output. Content-sensitive vectorization hashing is useful in determining whether two segments are identical or similar.

It should be appreciated that other embodiments may use alternate methods to content-sensitive vectorization, such as clustering or direct text matching. It should also be appreciated that in accordance with some embodiments, text normalization can be performed to normalize the content of each document. For example, double spaces can be treated as single spaces, smart quotes as quotes, etc., so as to expand the determination as to what segments are identical.

At procedure 420, the content-sensitive vectors for each document of the plurality of electronic documents are then compared, and segments having identical content-sensitive vectors are identified. In some embodiments, identical segments are identified as those having an identical content-sensitive vectors. In other embodiments, for example where text normalization was not performed prior to the generation of the content-sensitive hashes, identical segments are identified as those having content-sensitive vector or hash values within a threshold range (e.g., a similarity threshold).

At procedure 425, segments having content-sensitive vectorizations that are within the similarity threshold into a plurality of segment groups are grouped. In some embodiments, procedure 425 also includes the procedures of the flow diagram of FIG. 4B. At procedure 426 of FIG. 4B, for a segment group of the plurality of segment groups for which segments of the segment group are not identical, portions of the segments of the segment group that are not identical are identified. At procedure 428, the portions of the segments of the segment group that are not identical are removed from the segments, resulting in a normalized segment for the segment group, in which the normalized segment comprises identical text. In some embodiments, as shown at procedure 432, the removed portions within the normalized segment are marked to identify the removed portions.

Returning to FIG. 4A, in some embodiments, as shown at procedure 430, for each document, the number of segments in other documents that are duplicates of segments in that document (referred to as "external duplicate segments") are counted. For efficiency, the result of the counting can be used for selecting documents with the highest or a high number of external duplicate segments for which to start the document review.

In accordance with some embodiments, as shown at procedure 435, the documents are then sorted to start the review process. It should be appreciated that selection of an appropriate starting document and sorting can improve the performance of the review process. For example, an iterative process can be used which first identifies the document with most common external duplicate segments and add that to the documents to review. All of the identified duplicate segments from remaining documents are then removed. The identification of a document and the removal of duplicate segments is iteratively performed until there are no documents left to iterate. In some embodiments, to make this process more efficient, early stopping criteria can be utilized such that if the number of the most common duplicate segments is below a certain threshold, all the documents are added to the sorted review list as is. This early stopping criteria can make the process more efficient especially for corpuses that contain a very large number of heterogeneous contracts.

At procedure 440, information is extracted from the documents based at least in part on the identified identical segments and the sorted list. In some embodiments, using natural language processing (NLP) or manual reviewers (or a combination thereof), information is extracted from the documents in the order in a sorted review list into a database containing the location and order of each segment as well as the label and value of the extracted information.

At procedure 445, the extracted information is propagated from duplicate segments to external duplicate segments into the extraction database with reference to the location of the segments in the documents in which they occur. In some embodiments, segments that are not duplicate segments, but have a content-sensitive vector within a predefined range of distance from each other or are within a threshold distance of each other, are identified as similar segments. For example, hash distances for ranges can be arbitrarily defined, or can be adjusted based on human feedback to increase or decrease the number of substantively similar sentences captured within all ranges or within a particular range.

With reference to FIG. 4C, flow diagram 400 continues at procedure 450. In some embodiments, as shown at procedure 450, segment groups are displayed within a graphical user interface (GUI). Using the GUI, changes from the first or most frequently occurring similar segment in a range with a text comparison algorithm are highlighted or otherwise shown (e.g., a "Redline GUI"). In the Redline GUI, a human operator able to designate one or more groups of similar segments as substantively duplicative, as shown at procedure 455, in which case the process will handle that group as it would duplicate segments (e.g., propagating any extracted information in respect of the relevant external duplicate segments within the extraction database). In some embodiments, alternately or additionally, a tool could be used to identify within differing text from within similar segments specific spans that could be normalized and algorithmically assigned values (for example, for three segments, "The Governing Law is California", "The Governing Law is Delaware" and "The Governing Law is New York", the differences could be recognized as US States, with as each being a Governing Law provision).

At procedure 460, in various embodiments, changes or edits to a segment are received (e.g., at the GUI). At procedure 465, the changes are propagated to other segments of the segment group including the edited segment. In some embodiments, where the segment has been normalized removing non-identical portions (e.g., as described in FIG. 4B), the changes are propagated to the normalized segment. At procedure 470, for normalized segments, the removed portions are replaced.

It is noted that any of the procedures, stated above, regarding the flow diagrams of FIGS. 4A through 4C, may be implemented in hardware, or a combination of hardware with firmware and/or software. For example, any of the procedures are implemented by a processor(s) of a cloud environment and/or a computing environment.

Example Computer System

Figure 5:
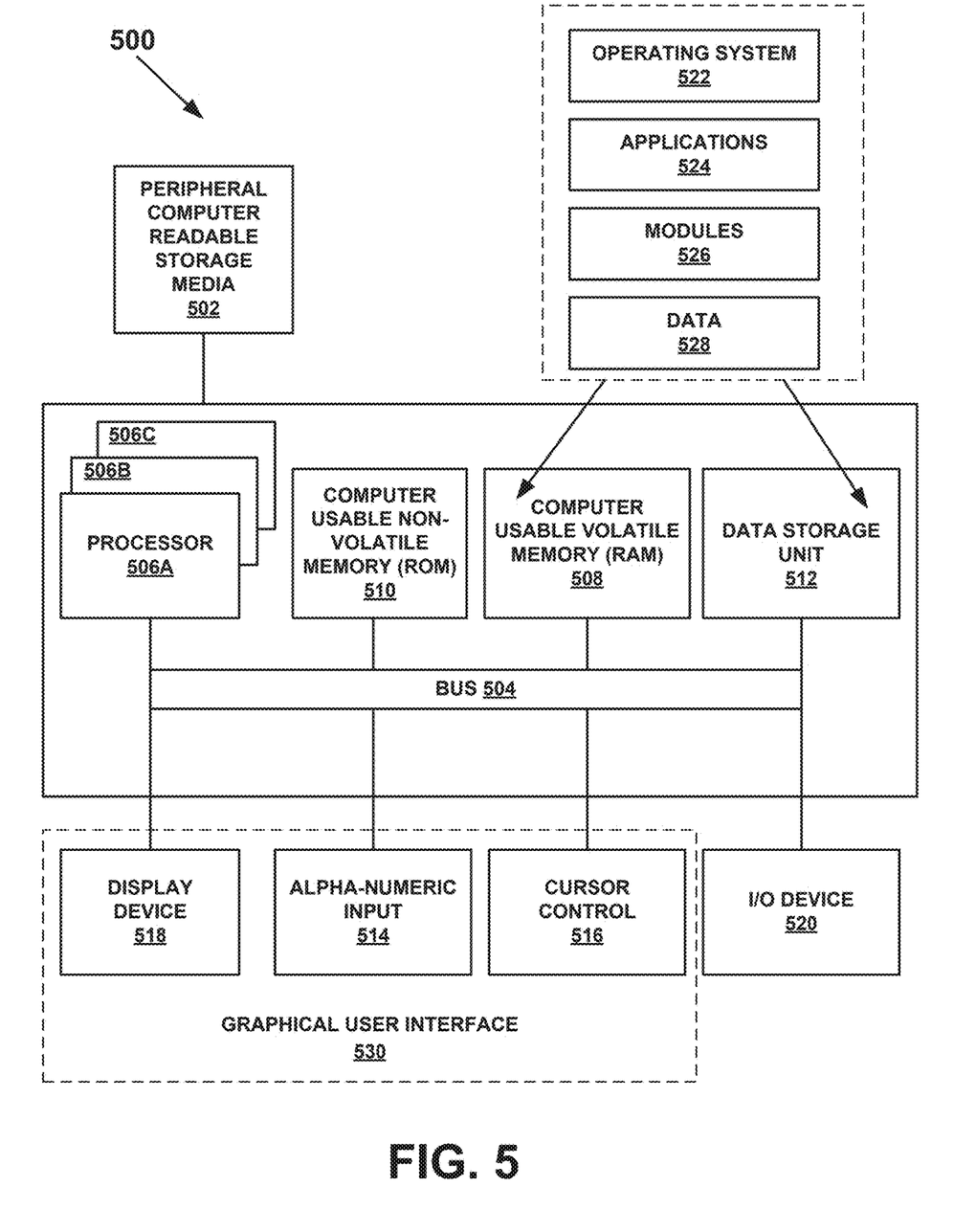
FIG. 5 is a block diagram of an example computer system upon which embodiments of the present invention can be implemented.

FIG. 5 is a block diagram of an example computer system 500 upon which embodiments of the present invention can be implemented. FIG. 5 illustrates one example of a type of computer system 500 (e.g., a computer system) that can be used in accordance with or to implement various embodiments which are discussed herein.

It is appreciated that computer system 500 of FIG. 5 is only an example and that embodiments as described herein can operate on or within a number of different computer systems including, but not limited to, general purpose networked computer systems, embedded computer systems, mobile electronic devices, smart phones, server devices, client devices, various intermediate devices/nodes, stand-alone computer systems, media centers, handheld computer systems, multi-media devices, and the like. In some embodiments, computer system 500 of FIG. 5 is well adapted to having peripheral tangible computer-readable storage media 502 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

Computer system 500 of FIG. 5 includes an address/data bus 504 for communicating information, and a processor 506A coupled with bus 504 for processing information and instructions. As depicted in FIG. 5, computer system 500 is also well suited to a multi-processor environment in which a plurality of processors 506A, 506B, and 506C are present. Conversely, computer system 500 is also well suited to having a single processor such as, for example, processor 506A. Processors 506A, 506B, and 506C may be any of various types of microprocessors. Computer system 500 also includes data storage features such as a computer usable volatile memory 508, e.g., random access memory (RAM), coupled with bus 504 for storing information and instructions for processors 506A, 506B, and 506C. Computer system 500 also includes computer usable non-volatile memory 510, e.g., read only memory (ROM), coupled with bus 504 for storing static information and instructions for processors 506A, 506B, and 506C. Also present in computer system 500 is a data storage unit 512 (e.g., a magnetic or optical disc and disc drive) coupled with bus 504 for storing information and instructions. Computer system 500 also includes an alphanumeric input device 514 including alphanumeric and function keys coupled with bus 504 for communicating information and command selections to processor 506A or processors 506A, 506B, and 506C. Computer system 500 also includes a cursor control device 516 coupled with bus 504 for communicating user input information and command selections to processor 506A or processors 506A, 506B, and 506C. In one embodiment, computer system 500 also includes a display device 518 coupled with bus 504 for displaying information.

Referring still to FIG. 5, display device 518 of FIG. 5 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 516 allows the computer user to dynamically signal the movement of a visible symbol (cursor) on a display screen of display device 518 and indicate user selections of selectable items displayed on display device 518. Many implementations of cursor control device 516 are known in the art including a trackball, mouse, touch pad, touch screen, joystick or special keys on alphanumeric input device 514 capable of signaling movement of a given direction or manner of displacement. Alternatively, it will be appreciated that a cursor can be directed and/or activated via input from alphanumeric input device 514 using special keys and key sequence commands. Computer system 500 is also well suited to having a cursor directed by other means such as, for example, voice commands. In various embodiments, alphanumeric input device 514, cursor control device 516, and display device 518, or any combination thereof (e.g., user interface selection devices), may collectively operate to provide a graphical user interface (GUI) 530 under the direction of a processor (e.g., processor 506A or processors 506A, 506B, and 506C). GUI 530 allows user to interact with computer system 500 through graphical representations presented on display device 518 by interacting with alphanumeric input device 514 and/or cursor control device 516.

Computer system 500 also includes an I/O device 520 for coupling computer system 500 with external entities. For example, in one embodiment, I/O device 520 is a modem for enabling wired or wireless communications between computer system 500 and an external network such as, but not limited to, the Internet. In one embodiment, I/O device 520 includes a transmitter. Computer system 500 may communicate with a network by transmitting data via I/O device 520.

Referring still to FIG. 5, various other components are depicted for computer system 500. Specifically, when present, an operating system 522, applications 524, modules 526, and data 528 are shown as typically residing in one or some combination of computer usable volatile memory 508 (e.g., RAM), computer usable non-volatile memory 510 (e.g., ROM), and data storage unit 512. In some embodiments, all or portions of various embodiments described herein are stored, for example, as an application 524 and/or module 526 in memory locations within RAM 508, computer-readable storage media within data storage unit 512, peripheral computer-readable storage media 502, and/or other tangible computer-readable storage media.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible, regardless the degree of virtualization. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for extracting information from a plurality of electronic documents, the method comprising:
   accessing a plurality of electronic documents;
   automatically segmenting each electronic document of the plurality of electronic documents into a plurality of segments comprising at least one word;
   converting the segments into content-sensitive vectorizations;
   comparing the content-sensitive vectorizations to identify the content-sensitive vectorizations that are within a similarity threshold;
   grouping segments having content-sensitive vectorizations that are within the similarity threshold into a plurality of segment groups;
   removing duplicate segments of the plurality of segment groups from the plurality of electronic documents;
   extracting information from the plurality of segment groups for performing analysis of the plurality of electronic documents;
   propagating the information from the plurality of segment groups into a database with reference to a location of the segments in the electronic documents of the plurality of electronic documents in which the segments occur;
   displaying the plurality of segment groups within a graphical user interface;
   receiving changes to a reviewed segment of the plurality of segments at the graphical user interface; and
   propagating the changes to other segments of a segment group comprising the reviewed segment into the database, such that the plurality of segment groups of the plurality of electronic documents can be collectively analyzed.

2. The method of claim 1, further comprising:
   counting the content-sensitive vectorizations that are within the similarity threshold for each electronic document of the plurality of electronic documents.

3. The method of claim 1, further comprising:
   receiving an indication that at least two segment groups of the segment groups are duplicative.

4. The method of claim 1, further comprising:
   identifying an electronic document of the plurality of electronic documents as a starting document; and
   iteratively removing duplicate segments of the plurality of electronic documents;
   wherein the duplicate segments removed from the plurality of electronic documents are segments of the plurality of electronic documents that are duplicate segments of the starting document.

5. The method of claim 4, wherein the starting document is an electronic document of the plurality of electronic documents with most common duplicate segments of the plurality of electronic documents.

6. A method for extracting information from a plurality of electronic documents, the method comprising:
accessing a plurality of electronic documents;
automatically segmenting each electronic document of the plurality of electronic documents into a plurality of segments comprising at least one word;
converting the segments into content-sensitive vectorizations;
comparing the content-sensitive vectorizations to identify the content-sensitive vectorizations that are within a similarity threshold;
grouping segments having content-sensitive vectorizations that are within the similarity threshold into a plurality of segment groups;
for a segment group of the plurality of segment groups having content-sensitive vectorizations that are within the similarity threshold, identifying portions of the segments of the segment group that are not identical;
removing the portions of the segments of the segment group that are not identical, resulting in a normalized segment for the segment group, in which the normalized segment comprises identical text;
removing duplicate segments of the plurality of segment groups from the plurality of electronic documents;
extracting information from the plurality of segment groups for performing analysis of the plurality of electronic documents;
propagating the information from the plurality of segment groups into a database with reference to a location of the segments in the electronic documents of the plurality of electronic documents in which the segments occur;
displaying the plurality of segment groups within a graphical user interface;
receiving changes to a reviewed segment of the plurality of segments at the graphical user interface; and
propagating the changes to other segments of a segment group comprising the reviewed segment into the database, such that the plurality of segment groups of the plurality of electronic documents can be collectively analyzed.

7. The method of claim 6, further comprising:
marking removed portions within the normalized segment to identify the removed portions.

8. The method of claim 6, further comprising:
receiving changes to the normalized segment of the plurality of segments; and
propagating the changes to all instances of the normalized segment for the segment group.

9. The method of claim 8, further comprising:
replacing removed portions of the segments of the segment group.

10. The method of claim 6, further comprising:
counting the content-sensitive vectorizations that are within the similarity threshold for each electronic document of the plurality of electronic documents.

11. The method of claim 6, further comprising:
receiving an indication that at least two segment groups of the segment groups are duplicative.

12. A method for extracting information from a plurality of electronic documents, the method comprising:
accessing a plurality of electronic documents, wherein the plurality of electronic documents comprises legal contracts;
automatically segmenting each electronic document of the plurality of electronic documents into a plurality of segments comprising at least one word;
converting the segments into content-sensitive vectorizations;
comparing the content-sensitive vectorizations to identify the content-sensitive vectorizations that are within a similarity threshold;
grouping segments having content-sensitive vectorizations that are within the similarity threshold into a plurality of segment groups;
removing duplicate segments of the plurality of segment groups from the plurality of electronic documents;
extracting information from the plurality of segment groups for performing analysis of the plurality of electronic documents;
propagating the information from the plurality of segment groups into a database with reference to a location of the segments in the electronic documents of the plurality of electronic documents in which the segments occur;
displaying the plurality of segment groups within a graphical user interface;
receiving changes to a reviewed segment of the plurality of segments at the graphical user interface; and
propagating the changes to other segments of a segment group comprising the reviewed segment into the database, such that the plurality of segment groups of the plurality of electronic documents can be collectively analyzed.

13. The method of claim 12, further comprising:
counting the content-sensitive vectorizations that are within the similarity threshold for each electronic document of the plurality of electronic documents.

14. The method of claim 12, further comprising:
receiving an indication that at least two segment groups of the segment groups are duplicative.

15. A method for extracting information from a plurality of electronic documents, the method comprising:
accessing a plurality of electronic documents;
performing text normalization on the plurality of electronic documents;
automatically segmenting each electronic document of the plurality of electronic documents into a plurality of segments comprising at least one word;
converting the segments into content-sensitive vectorizations;
comparing the content-sensitive vectorizations to identify the content-sensitive vectorizations that are within a similarity threshold;
grouping segments having content-sensitive vectorizations that are within the similarity threshold into a plurality of segment groups;
removing duplicate segments of the plurality of segment groups from the plurality of electronic documents;
extracting information from the plurality of segment groups for performing analysis of the plurality of electronic documents;
propagating the information from the plurality of segment groups into a database with reference to a location of the segments in the electronic documents of the plurality of electronic documents in which the segments occur;
displaying the plurality of segment groups within a graphical user interface;
receiving changes to a reviewed segment of the plurality of segments at the graphical user interface; and
propagating the changes to other segments of a segment group comprising the reviewed segment into the database, such that the plurality of segment groups of the plurality of electronic documents can be collectively analyzed.

16. The method of claim 15, further comprising:
counting the content-sensitive vectorizations that are within the similarity threshold for each electronic document of the plurality of electronic documents.

17. The method of claim 15, further comprising:
receiving an indication that at least two segment groups of the segment groups are duplicative.

18. A method for extracting information from a plurality of electronic documents, the method comprising:
accessing a plurality of electronic documents;
automatically segmenting each electronic document of the plurality of electronic documents into a plurality of segments comprising at least one word;
converting the segments into content-sensitive vectorizations;
comparing the content-sensitive vectorizations to identify the content-sensitive vectorizations that are within a similarity threshold;
grouping segments having content-sensitive vectorizations that are within the similarity threshold into a plurality of segment groups; and
removing duplicate segments of the plurality of segment groups from the plurality of electronic documents;
extracting information from the plurality of segment groups for performing analysis of the plurality of electronic documents, wherein the extracting information from the plurality of segment groups for performing analysis of the plurality of electronic documents comprises:
propagating extracted information into a database for performing the analysis of the plurality of electronic documents;
displaying the plurality of segment groups within a graphical user interface;
receiving changes to a reviewed segment of the plurality of segments at the graphical user interface; and
propagating the changes to other segments of a segment group comprising the reviewed segment into the database, such that the plurality of segment groups of the plurality of electronic documents can be collectively analyzed.

19. The method of claim 18, further comprising:
counting the content-sensitive vectorizations that are within the similarity threshold for each electronic document of the plurality of electronic documents.

20. The method of claim 18, further comprising:
receiving an indication that at least two segment groups of the segment groups are duplicative.

\* \* \* \* \*